United States Patent
Ho et al.

(10) Patent No.: US 7,577,670 B2
(45) Date of Patent: Aug. 18, 2009

(54) METHOD AND APPARATUS FOR INFERRING ADDRESS AND SUBNET RELATIONSHIPS

(75) Inventors: Yong Boon Ho, Ft. Collins, CO (US); Dipankar Gupta, Ft. Collins, CO (US); Swamy Mandavilli, Ft. Collins, CO (US); Zhi-Qiang Wang, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 466 days.

(21) Appl. No.: 10/794,063

(22) Filed: Mar. 8, 2004

(65) Prior Publication Data
US 2005/0198049 A1    Sep. 8, 2005

(51) Int. Cl.
*G06F 7/00* (2006.01)
(52) U.S. Cl. .......................... 707/100; 707/3
(58) Field of Classification Search ................ 707/100, 707/3; 709/230, 238; 370/351, 432, 400; 711/206, 216
See application file for complete search history.

(56) References Cited

U.S. PATENT DOCUMENTS

| | | | | |
|---|---|---|---|---|
| 6,141,738 | A * | 10/2000 | Munter et al. | 711/206 |
| 6,532,217 | B1 * | 3/2003 | Alkhatib et al. | 370/252 |
| 6,954,794 | B2 * | 10/2005 | Rudd et al. | 709/230 |
| 7,058,725 | B2 * | 6/2006 | Mathew et al. | 709/238 |
| 2004/0165602 | A1 * | 8/2004 | Park et al. | 370/401 |
| 2004/0233849 | A1 | 11/2004 | Cole | |

* cited by examiner

*Primary Examiner*—Charles Rones
*Assistant Examiner*—Fariborz Khoshnoodi

(57) ABSTRACT

Methods and systems are disclosed for inferring address and subnet relationships. An exemplary method includes identifying a first address associated with a subnet; determining a length of a prefix part of the first address; determining a length of a prefix part of a second address; determining when a portion of the second address matches a portion of the first address; and determining when the lengths of the prefix parts of the first and second addresses are equal. A relationship between the second address and the subnet is inferred when the portion of the second address matches the portion of the first address and the lengths of the prefix parts of the first and second addresses are equal.

36 Claims, 4 Drawing Sheets

METHOD AND APPARATUS FOR INFERRING ADDRESS AND SUBNET RELATIONSHIPS

BACKGROUND

Internet Protocol Version 4 (IPv4) is the dominant network layer protocol used today to route information over the Internet. With the continuing rapid growth of the Internet, the approximate four billion available IPv4 Internet addresses (or IP addresses) are being consumed at a very high rate. Projections show that the entire IPv4 address space will be exhausted sometime between the years 2005 and 2011. Certain classes of IPv4 addresses, such as Class A and B addresses, are rarely available today, and some parts of the world (most notably Japan) are already seriously impacted by the shortage.

The depletion of IP addresses has caused developers and users to pursue various "patching" strategies to continue using IPv4 addressing. As a consequence, IPv4 routing tables are experiencing explosive growth, significantly slowing router performance. In addition, variable-length packet headers and en route packet fragmentation are further reducing router performance. Patching has also raised data security issues that often constrain businesses from exchanging sensitive data over the Internet.

To address the shortage of IP addresses, the Internet Engineering Task Force (IETF) has proposed a next generation network layer protocol called Internet Protocol Version 6, or IPv6. IPv6 is intended to be the next step in the evolution of the dominant IPv4 protocol used throughout internet and corporate networks today. Although IPv6 addressing is not backward compatible with IPv4 addressing, devices having IPv6 addresses can co-exist with devices having IPv4 addresses on IP networks as IPv6 usage grows. IPv6 adoption is expected to occur gradually, with early adoption occurring by customers that need its advanced features or need to utilize its expanded address space.

Unlike IPv4, which uses 32-bit addresses of four 8-bit decimal parts (e.g., 10.142.128.66), IPv6 uses 128-bit addresses, providing a virtually unlimited addressing space. IPv6 addresses are divided into eight 16-bit parts, with each 16-bit part typically being represented as four hexadecimal numbers. For example, the IPv6 address:

0011 1111 1111 1110 1000 0000 1111 0000

0000 0000 0000 0010 0000 0000 0000 0000

0000 0000 0000 0000 0000 0000 0001 0000

0000 0000 0000 0000 0000 0000 0000 0001 can be represented as: 3FFE:80F0:0002:0000:0000:0010:0000:0001. According to convention, leading zeroes can be omitted from the representation, and a double colon ("::") can be used (once per address) to replace consecutive 16-bit zeroes. Thus, the exemplary IPv6 address shown above can be represented as: 3FFE:80F0:2::10:0:1.

IPv6 addresses can be grouped into a hierarchy of networks and sub-networks (or subnets) using "prefixes", similar to the manner in which IPv4 addresses can be grouped into subnets using subnet masks. A prefix, designated by a forward slash ("/") followed by a number of bits (in decimal) in an IPv6 address, specifies a number of most significant (or first) bits used in an IPv6 address to define a particular network (or network portion) in an internet or corporate network. An IPv6 address used to define a network (or network portion) is often referred to as "prefix group address", and the group of addresses included in the network definition can be referred to as a "prefix group".

For example, the IPv6 prefix group address 3FFE:80F0:2::/48 can be used to define a prefix group that includes all devices within an internet or corporate network having globally-scoped addresses that begin with these same 48 bits. A prefix group can be partitioned into additional prefix groups (or subnets) using related prefix group addresses. For example, the exemplary network defined above (3FFE:80F0:2::/48) can be partitioned into three prefix groups having the prefix group addresses: 3FFE:80F0:2:AC::/64, 3FFE:80F0:2:1B15/64, and 3FFE:80F0:2:C5F:A::/80. Any particular device in a network can belong to a number of different prefix groups (or subnets).

The virtually unlimited addressing space of IPv6 and the flexibility afforded by its use of prefixes in defining networks and subnets, can be used to address the many challenges facing users of IPv4-based networks. As the use of IPv6 addressing expands, it will be useful to understand the relationships between devices, having particular IPv6 and IPv4 addresses, and the prefix groups or subnets to which those devices belong.

SUMMARY

Accordingly, methods and systems are disclosed for inferring address and subnet relationships. An exemplary method and system are disclosed for identifying a first address associated with a subnet; determining a length of a prefix part of the first address; determining a length of a prefix part of a second address; determining when a portion of the second address matches a portion of the first address; and determining when the lengths of the prefix parts of the first and second addresses are equal. A relationship between the second address and the subnet is inferred when the portion of the second address matches the portion of the first address and the lengths of the prefix parts of the first and second addresses are equal. A display associated with a processor can be used for presenting the relationship.

According to another exemplary embodiment, a method and associated system are described for inferring address and subnet relationships. The method includes determining a length of a prefix part of a first address; determining a length of a prefix part of a second address; determining when the second address is a subnet address; identifying a subnet associated with the second address when the second address is a subnet address; determining when a portion of the second address matches a portion of the first address; and determining when the lengths of the prefix parts of the first and second addresses are equal. A relationship between the subnet and the first address is inferred when the portion of the second address matches the portion of the first address and the lengths of the prefix parts of the first and second addresses are equal. A display associated with a processor can be used for presenting the relationship.

According to yet another exemplary embodiment, a data model is described for inferring address and subnet relationships. The data model includes: a subnet object associated with a first address, the subnet object including a first code module configured to determine when a second address is included in a subnet associated with the first address; and an address object associated with the second address, the address object including a second code module configured to determine when the subnet associated with the first address includes the second address.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements, and.

DETAILED DESCRIPTION

Figure 1:
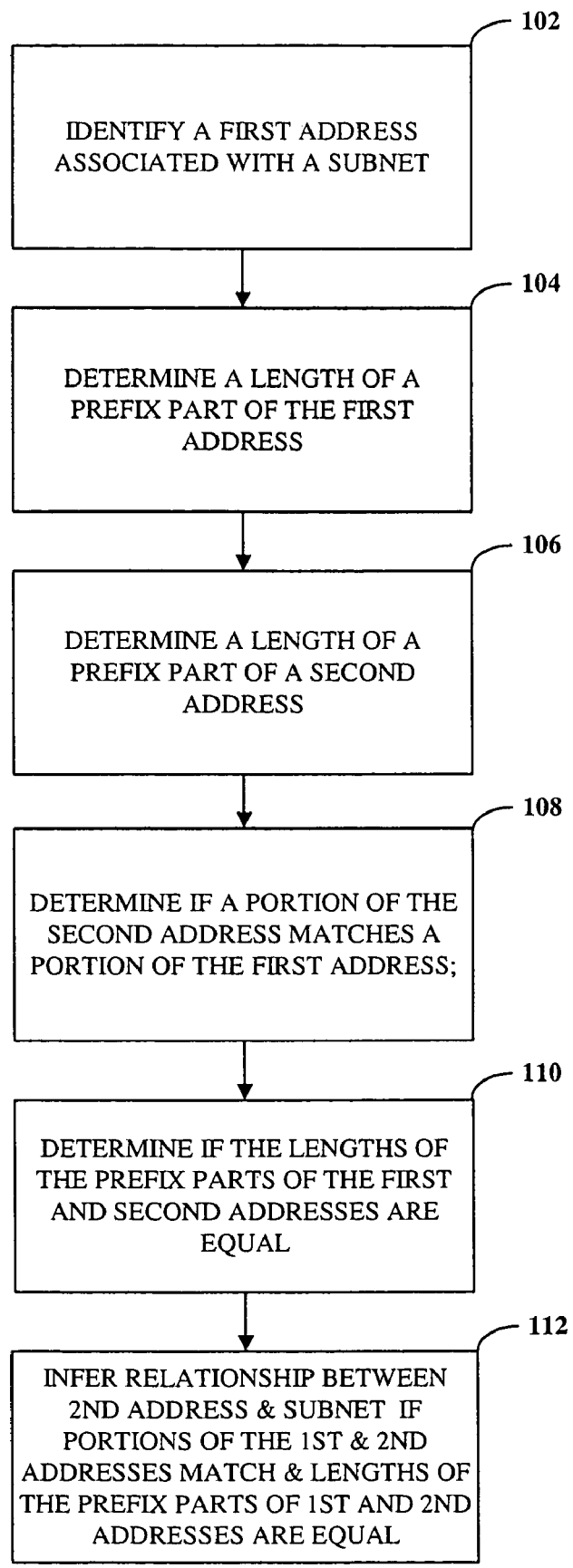
FIG. 1 is a flowchart illustrating a method for inferring address and subnet relationships according to a first exemplary embodiment.

FIG. 1 is a flowchart illustrating a method for inferring address and subnet relationships according to a first embodiment. In the first embodiment, the addresses belonging to a particular subnet can be determined. In block 102, a first address associated with the subnet is identified. The first address can be an IPv6 prefix group address included in an address table of a relational database management system (RDBMS). For example, the first address can be the IPv6 prefix group address 3FFE::/16, having AddressID 400, stored in the address table shown in Table 1.

Next, in block 104, a length of a prefix part of the first address is determined. For example, using information such as the PrefixLength entries included in Table 1, it can be determined that the length of the prefix part of this address is sixteen (16) bits. In block 106, a length of a prefix part of a second address is determined. The second address can be stored in a separate address table than the first address or can be included in the same RDBMS address table as the first address. For example, the second address can be the IPv6 address 3FFE::2 having AddressID 100 included in Table 1. Again, information such as the PrefixLength entries included in Table 1, can be used to determine that the length of the prefix part of this address is also sixteen (16) bits.

Next, in block 108, a determination is made whether a portion of the second address matches a portion of the first address. For example, information, such as the bit string entries AddressBS included in Table 1, can be used to determine that a portion (e.g., the prefix part "0011111111111110") of the second address having AddressID 100 in the table matches the prefix part of the first address having the AddressID 400 in the table. Then, in block 110, it is determined whether the lengths of the prefix parts of the first and second addresses are equal. Again, information, such as the PrefixLength entries included in Table 1, can be used in determining when the lengths of the prefix parts are equal.

TABLE 1

Exemplary RDBMS Address Table

| AddressID | AddressBS | Prefix-Length | Address | isSubnet-Address |
|---|---|---|---|---|
| 100 | 0011111111111110 0000000000000000 0000000000000000 0000000000000000 0000000000000000 | 16 | 3FFE::2 | No |
| 200 | 0000000000000000 0000000000000000 0000000000000010 0011111111110000 0000000000000000 0000000000000000 0000000000000000 0000000000000000 0000000000000000 0000000000000010 | 16 | 3FF0::2 | No |
| 300 | 0011111111111110 0000000000000000 0000000000000000 0000000000000000 0000000000000000 0000000000000000 0000000000000000 0000000000000010 | 12 | 3FFE::2 | No |
| 400 | 0011111111111110 0000000000000000 0000000000000000 0000000000000000 0000000000000000 0000000000000000 0000000000000000 0000000000000000 | 16 | 3FFE:: | Yes |
| 500 | 00111111 11111110 00000000 00000010 | 16 | 63.254.0.2 | No |

In block 112, a relationship between the second address and the subnet is inferred when the portion of the second address matches the portion of the first address and the lengths of the prefix parts of the first and second addresses are equal. Continuing with the example introduced above, a relationship between the address having AddressID 100 and the IPv6 prefix group corresponding to the prefix group address having AddressID 400 is inferred, because portions of the addresses (e.g., the prefix parts "0011111111111110") match, and the lengths of the prefix parts (e.g., the PrefixLength included in Table 1) of the addresses are equal to sixteen (16) bits.

In contrast, although a portion of the address having AddressID 300 in Table 1 matches a portion of the address having Address ID 400 (e.g., the portion "0011111111111110"), a relationship between the address having AddressID 300 and the IPv6 prefix group corresponding to the prefix group address having AddressID 400 is not inferred, because the lengths of the prefix parts of the addresses (e.g., twelve and sixteen bits, respectively) are not equal.

According to a related exemplary embodiment, the first address can be converted to a binary bit string, and the binary bit string can be truncated to the length of the prefix part of the first address to form the portion of the first address. For example, the address 3FFE:: having AddressID 400 in Table 1 can be converted to a binary string, and then truncated to the length of the prefix part (e.g., sixteen bits) to form the portion of the first address "0011111111111110".

Determining whether the portions of the first and second addresses match can include performing a Structured Query Language (SQL) wildcard match for the second address, e.g., on an address table stored in an RDBMS, using the truncated binary bit string. For example, the SQL query:

"Select AddressID from Address where AddressBS
    like 'finalBitString %' and PrefixLength=length"

can be run against an address table, such as that shown in Table 1, to determine whether the portions of the first and second addresses match. The percent ("%") symbol in the exemplary query signifies the wildcard matching.

According to a related exemplary embodiment, a determination can be made whether the second address is a subnet address before inferring a relationship between a subnet and an address. This can be useful when the first and second addresses are stored in the same RDBMS address table. For example, the address table shown in Table 1 includes both IPv6 prefix group addresses (e.g., the address with AddressID 400) and non-prefix group IPv6 addresses (the remaining entries in the table). The exemplary address table includes entries is SubnetAddress that identify whether a particular address entry in the table is an IPv6 prefix group address. Because in the first embodiment the addresses belonging to a particular subnet are being determined, a relationship between the second address and the subnet can be inferred only when the second address is not a subnet address. The SQL query described above can be modified to also determine when the second address is a subnet address as follows:

"Select AddressID from Address where AddressBS
    like 'finalBitString %' and PrefixLength=length
    and is SubnetAddress='No'"

An interface associated with the second address can be identified, as well as a node associated with the interface. Consequently, the interfaces and/or nodes belonging to a particular subnet can be determined. This information can be used in a network management environment to aid in monitoring Internet and corporate networks.

Figure 4:
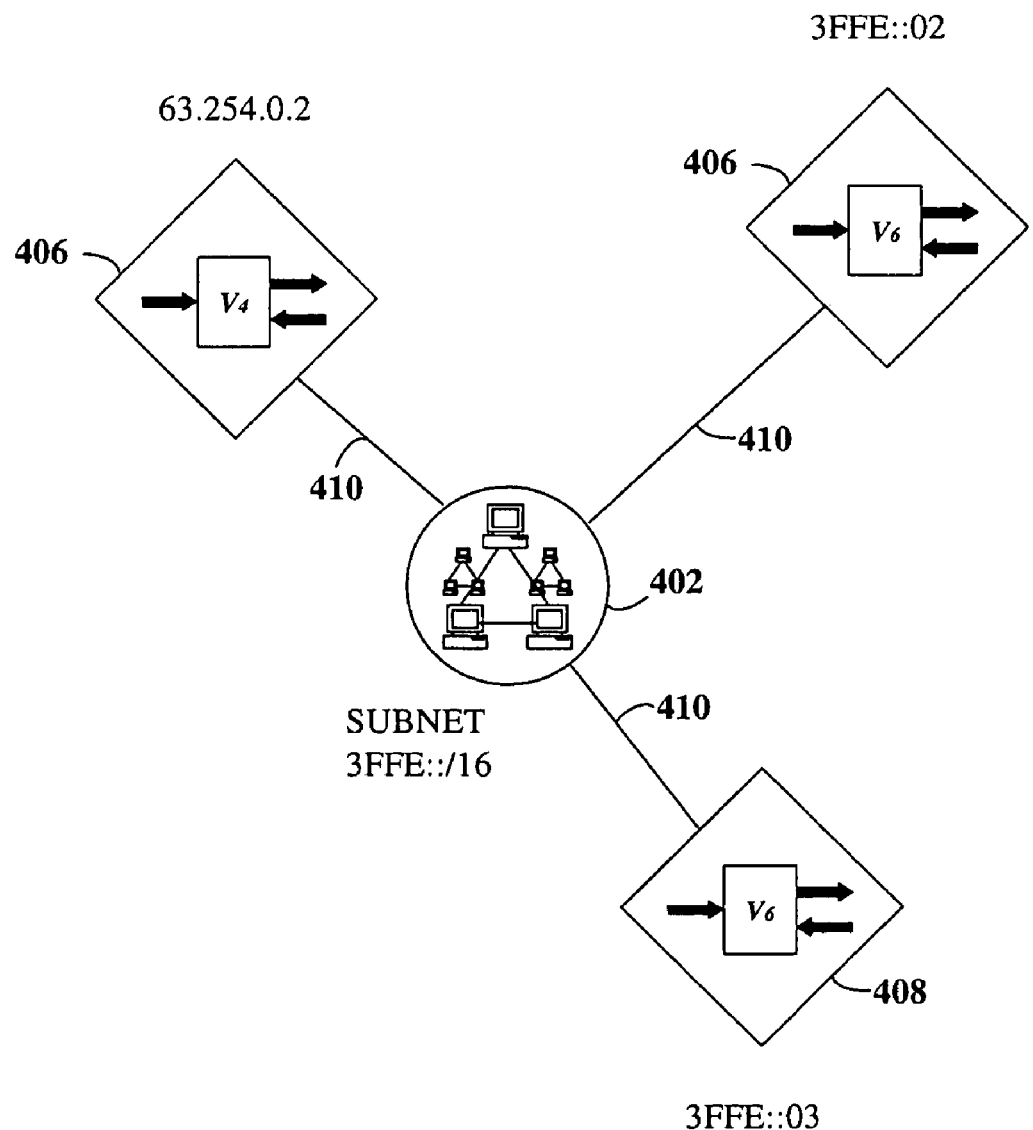
FIG. 4 illustrates a system for presenting inferred address and subnet relationships according to an exemplary embodiment.

According to an exemplary embodiment, a first symbol can be presented representing the subnet connected to a second symbol representing a device having the second address when a relationship is inferred between the second address and the subnet. The presentation can be made on a display as shown in FIG. 4. For example, the subnet symbol 402 can be presented to represent the IPv6 prefix group 3FEE::/16 having the prefix group address 3FEE:: stored in Table 1 at AddressID 400. A second symbol 406 can be used to represent a device having the IPv6 address 3FEE::2, having AddressID 100 in Table 1. The connecting line 410 between the first and second symbols can be used to indicated that a relationship is inferred between the second address and the subnet. Additional symbols can be included to represent other devices included in the subnet. For example, the symbol 406 can represent a device having the IPv4 address 63.254.0.2, which has the same prefix part ("0011111111111110") as the prefix group address 3FEE::/16. Also, a fourth symbol 408 can be used to represent another device having an IPv6 address 3FEE::3, which is also included in the subnet 402.

Figure 2:
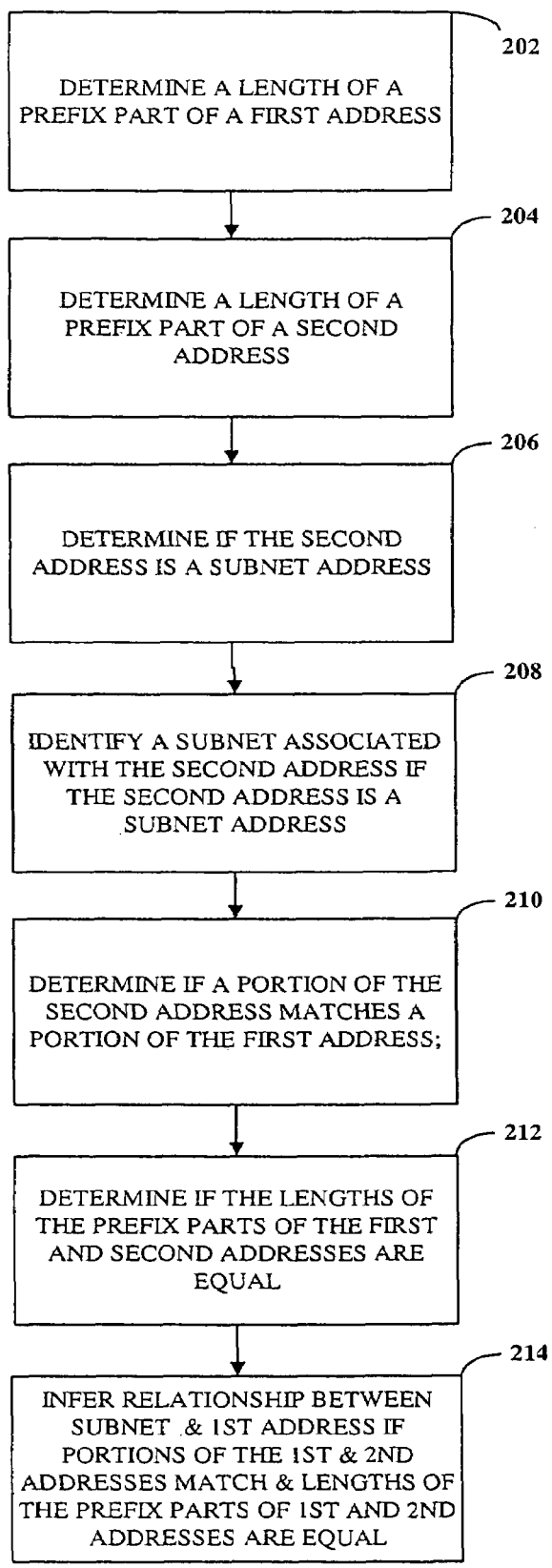
FIG. 2 is a flowchart illustrating a method for inferring address and subnet relationships according to a second exemplary embodiment.

FIG. 2 illustrates a method for inferring address and subnet relationships according to a second embodiment. In the second embodiment, the subnets to which a particular address belongs can be determined. As described in conjunction with first exemplary embodiment illustrated in FIG. 1, the lengths of the prefix parts of first and second addresses are determined in blocks 202 and 204, respectively. For example, the length of the prefix part of a desired first address, such as the address having AddressID 100 in Table 1, can be determined to be sixteen (16) bits. Similarly, the length of the prefix part of a second address, such as the address having AddressID 400 in Table 1, can be determined to be sixteen (16) bits, as well.

Next, in block 206, a determination is made whether the second address is a subnet address. For example, using information such as the is SubnetAddress entries included in Table 1, it can be determined that the address having AddressID 400 is an IPv6 prefix group address. When it is determined that the second address is a subnet address, a subnet associated with the second address is identified in block 208. The subnet can be identified using its corresponding subnet address, e.g., the IPv6 prefix group address 3FEE::/16.

Next, in block 210, a determination is made whether a portion of the second address matches a portion of the first address. Again, information, such as the bit string entries AddressBS included in Table 1, can be used to determine that a portion (e.g., the prefix part "0011111111111110") of the second address having AddressID 400 in the table matches the prefix part of the first address having the AddressID 100 in the table. Then, in block 212, it is determined whether the lengths of the prefix parts of the first and second addresses are equal. Again, information, such as the PrefixLength entries included in Table 1, can be used in determining when the lengths of the prefix parts are equal.

In block 214, a relationship between the subnet and the first address is inferred when the portion of the second address matches the portion of the first address and the lengths of the prefix parts of the first and second addresses are equal. Continuing with the example introduced above, a relationship between the IPv6 prefix group corresponding to the IPv6 prefix group address having AddressID 400 and the IPv6 address having AddressID 100 is inferred, because portions of the addresses (e.g., the prefix parts "0011111111111110") match, and the lengths of the prefix parts (e.g., the PrefixLength included in Table 1) of the addresses are equal to sixteen (16) bits.

In contrast, although a portion of the address having AddressID 300 in Table 1 matches a portion of the address having Address ID 100 (e.g., the portion "0011111111111110"), a relationship is not inferred because the address having AddressID 300 in Table 1 is not an IPv6 prefix group address.

According to a related exemplary embodiment, the first address can be converted to a binary bit string, and the binary bit string can be truncated to the length of the prefix part of the first address to form the portion of the first address. For example, the address 3FFE::2 having AddressID 100 in Table 1 can be converted to a binary string, and then truncated to the length of the prefix part (e.g., sixteen bits) to form the portion of the first address "0011111111111110".

Determining whether the portions of the first and second addresses match can include first determining a length of the converted binary bit string. For example, in the case of converting an IPv6 address to a binary bit string, such as the first address 3FFE::2 having AddressID 100 in Table 1, the determined length will be 128 bits. When the first address is an IPv4 address, such as the address 63.254.0.2 having AddressID 500 in Table 1, the determined length would be 32 bits (the length of an IPv4 address).

Next, at least one logical zero bit ("0") can be appended onto an end of the portion of the first address until the length of the truncated binary bit string plus the at least one appended logical zero bit equals the length of the binary bit string. For example, 112 logical zeroes can be appended onto the 16-bit truncated binary string "0011111111111110" to yield the 128-bit IPv6 address 3FFE::. Then, an SQL query for the second address can be performed using the truncated binary bit plus the at least one appended logical zero bit. The query can also determine whether the second address is a subnet address, as follows:

"Select AddressID, PrefixLength, Address from
    Address where AddressBS like 'finalBitString'
    and PrefixLength=length and is
    SubnetAddress='Yes'"

According to a related exemplary embodiment, the second address can be an IPv4 address, such as the address 63.254.0.2 having AddressID 500 in Table 1. In this case, the subnet can correspond to an IPv4 subnet and the second address can correspond to a subnet address of the IPv4 subnet. The lengths of the prefix parts of the first and second addresses can then be equal to a length of a subnet mask (e.g., the number of logical ones '1s' in the subnet mask) associated with the IPv4 subnet.

As in the case of the first embodiment, an interface associated with the second address can be identified, as well as a node associated with the interface. The interfaces and/or nodes belonging to a particular subnet can be determined, and this information used in a network management environment to aid in monitoring internet and corporate networks.

According to an exemplary embodiment, a first symbol can be presented representing the subnet connected to a second symbol representing a device having the first address when a relationship is inferred between the first address and the subnet. The presentation can be made on a display driven by an associated processor of a computer system, as shown in FIG. 4. For example, the processor can be used to execute the method of FIG. 1 and/or FIG. 2, and an associated display can be used to present relationships within a network. The subnet symbol 402 can, for example, be presented to represent the IPv6 prefix group 3FEE::/16 having the prefix group address 3FEE:: stored in Table 1 at AddressID 400. A second symbol 406 can be used to represent the device having the IPv6 address 3FEE::2, having AddressID 100 in Table 1. The connecting line 410 between the first and second symbols can be used to indicate that a relationship is inferred between the second address and the subnet. Additional symbols can be included to represent other devices included in the subnet. For example, the symbol 406 can represent a device having the IPv4 address 63.254.0.2, which has the same prefix part ("0011111111111110") as the prefix group address 3FEE::/16. Also, a fourth symbol 408 can be used to represent another device having an IPv6 address 3FEE::3, which is also included in the subnet 402.

Various aspects will now be described in connection with exemplary embodiments, including certain aspects described in terms of sequences of actions that can be performed by elements of a computer system. For example, it will be recognized that in each of the embodiments, the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described. For each of the various aspects, any such form of embodiment can be referred to herein as "a code module configured to" perform a described action.

Figure 3:
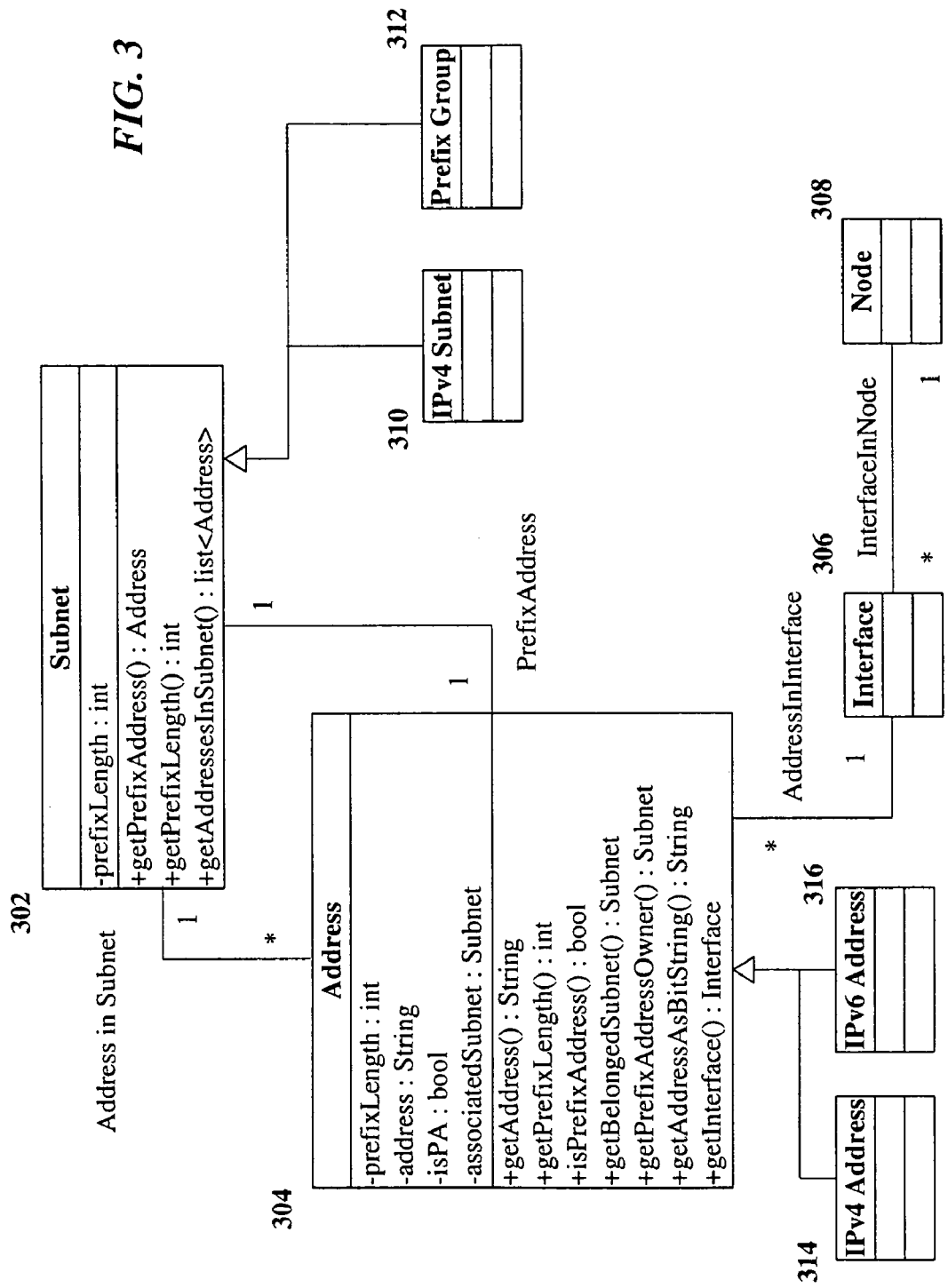
FIG. 3 illustrates a data model for inferring address and subnet relationships according to yet another exemplary embodiment.

A data model for inferring address and subnet relationships according to an exemplary embodiment is shown in FIG. 3. The data model includes a subnet object 302 associated with a first address. The subnet object 302 is a generalized class object related to an IPv4 subnet object 310 and a prefix object 312. The subnet object 302 includes a first code module getAddressesInSubnet( ) for determining when a second address is included in a subnet associated with the first address. The data model also includes an address object 304 associated with the second address. The address object 304 is a generalized class object related to an IPv4 address object 314 and an IPv6 address object 316. The address object 304 including a second code module getBelongedSubnet( ) for determining when the subnet associated with the first address includes the second address.

According to exemplary embodiments, the subnet object 302 can include a third code module configured to retrieve the first address from an RDBMS. For example, the first address can be stored in an address table in the RDBMS, such as the address table shown in Table 1. The subnet object 302 can also include a fourth code module configured to determine a length of a prefix part of the first address.

The address object 304 can include a fifth code module configured to retrieve the second address from a RDBMS. The second address can be stored in the same address table shown in Table 1, or a similar, but separate, address table included in the RDBMS. The address object 304 can also include a sixth code module configured to retrieve the second address from the RDBMS in a bit string format. For example, the second address can be retrieved from entries in an address table, such as the AddressBS entries shown in Table 1. A seventh code module can be included in the address object 304 for determining a length of a prefix part of the second address.

An eighth code module can be included in the address object 304 for determining when the second address is a subnet address. For example, entries in an address table, such as the is SubnetAddress entities, can be used to determine when the second address is an IPv6 prefix group address. When the second address is a subnet address, a ninth code module configured to identify a subnet associated with the second address can be included in the address object 304. The subnet identifier can be the subnet address associated with the subnet.

A tenth code module can be included in the address object for identifying at least one of an interface and a node associated with the second address. The identified interface and node can be associated with respective interface 306 and node 308 objects in the data model.

The instructions of a computer program as illustrated in FIGS. 1 and 2 for inferring address and subnet relationships can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Exemplary pseudo-code of computer program for carrying out the method illustrated in FIG. 1 follows:

```
//      Address - Address assigned to devices where network package
can travel
//      to the address as a destination. Used for both IPv4 address
and IPv6
//          addresses.
//      Prefix Address - The address associated with a subnet. It is used
for
//      routing purposes and can refer to an IPv6 prefix group address
or an
//          IPv4 subnet address.
//      PrefixLength - An integer associated with both an address and a
subnet
//      address which represents the number of significant bits used to
//      identify the prefix part of the address.
//      A Subnet object has the following methods :
//          getPrefixLength( ) - return the prefix length of the prefix address.
//          getPrefixAddress( ) - return the subnet address.
//          getAddressesInSubnet - retrieve all addresses contained in the
//          subnet.
//          getAddressesInSubnet( )
Let prefixAddress = Subnet.getAddress( )
Let length = Subnet.getPrefixLength( )
Let prefixBitString = ConvertAddressToBitString(prefixAddress)
Let finalBitString =    truncate prefixBitString to PrefixLength
//      Retrieve all Addresses belonging to the given subnet using, e.g.,
SQL
//      with wildcard match of the address value and prefix length and
the
//      address is not a subnet address.
Select AddressID from Address where AddressBS like 'finalBitString%'
and PrefixLength = length and isSubnetAddress = 'No'.
```

Exemplary pseudo-code of computer program for carrying out the method illustrated in FIG. 2 follows:

```
//      Address - Address assigned to devices where network package can
travel
//      to the address as a destination. Used for both IPv4 address and
IPv6
//          addresses.
//      Prefix Address - The address associated with a subnet. It is used
for
//      routing purposes and can refer to an IPv6 prefix group address
or an
//          IPv4 subnet address.
//      PrefixLength - An integer associated with both an address and a
subnet
//      address which represents the number of significant bits used to
//      identify the prefix part of the address
//      An Address object has the following methods :
//          getAddress( ) - return the IPv6 or IPv4 address.
//          getPrefixLength( ) - return the length of the prefix part of
address.
//          isPrefixAddress( ) - Boolean; true when address is a prefix
address.
//          getBelongedSubnet( ) - return prefix group or subnet of IPv6,
IPv4
//          address.
//          getPrefixAddressOwner( ) - return prefix group or subnet of prefix
//          address.
//          getAddressAsBitString( ) - return address in bit string format.
//          getInterface( ) - return interface associated with address.
//          getBelongedSubnet( )
Let address = Address.getAddress( )
Let length = Address.getPrefixLength( )
Let addressBitString = ConvertAddressToBitString (address)
Let finalBitString = truncate addressBitString to PrefixLength
Append '0' to finalBitString to be AddressLength //( which is 32
for IPv4
//      address and 128 for IPv6 address )
//      Retrieve all prefix addresses which "own" the given address,
e.g.,
//          using SQL.
Select AddressID, PrefixLength, Address from Address where
AddressBS like
```

```
'finalBitString' and PrefixLength = length and isSubnetAddress =
'Yes'.
```

As described above in conjunction with FIG. 4, subnet-address relationships can be presented in a network subnet view. The scope of the subnet view can be defined in terms of a number of a "hops" from a particular device of interest that subnet connections are to be presented in the view. A hop can be defined as a connection between portions of a network or subnet connected by a particular type of network device, such as the switches 406, 408 shown in the figure. For example, FIG. 4 shows a subnet view having a scope of one hop. Additional devices, including other subnets such as subnet 412, can be shown by increasing the number of hops displayed in the subnet view. Exemplary pseudo-code of a computer program for presenting inferred address and subnet relationships as illustrated in FIG. 4 follows:

```
// Given the source node
SubnetList ComputeNSubnet(Node SourceNode, Int MaxSubnetHop,
Int CurrentHop)
BEGIN
When CurrentHop + 1 >= MaxSubnetHop THEN
    RETURN NULL;
END
RetSubnetList
AddressList = Get all the Addresses ( both IPv4 or IPv6 ) in the
SourceNode
FOREACH address IN AddressList
DO
    SubList = address.getBelongedSubnet( )
    FOREACH subnet IN SubList
    DO
        NodeList = subnet.getNodeList( )
        FOREACH node IN NodeList
        DO
            RetSubnetList.add( ComputeNSubnet ( node,
MaxSubnetHop, CurrentHop + 1 ) )
        END
    END
END
RETURN RetSubnetList
END
```

It will be appreciated by those of ordinary skill in the art that the concepts and techniques described herein can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A computer implemented method for inferring address and subnet relationships, the method comprising:
    identifying, by a processor, a first address associated with a subnet;
    determining, by a processor, when a portion of a second address matches a portion of the first address; wherein the first address includes a prefix part and a non-prefix part; and the second address includes a prefix part and a non-prefix part;
    determining, by a processor, when lengths of the prefix parts of the first and second addresses are equal based on a first stored prefix length value corresponding to the first address and a second stored prefix length value corresponding to the second address;

inferring, by a processor, a relationship between the second address and the subnet when the portion of the second address matches the portion of the first address, and the first stored prefix length value and the second stored prefix length value are equal;

converting the first address to a binary bit string; and truncating the binary bit string to the length of the prefix part of the first address to form the portion of the first address;

wherein the determining when the portions of the first and second addresses match comprises performing an SQL wildcard match for the second address using the truncated binary bit string.

2. The method of claim 1, comprising:

determining when the second address is a subnet address; and inferring the relationship between the second address and the subnet when the second address is not a subnet address.

3. The method of claim 1, comprising:

identifying an interface associated with the second address; and identifying a node associated with the interface.

4. The method of claim 1, wherein:

the subnet is an IPv6 prefix group;

the first address is a prefix group address associated with the IPv6 prefix group; and the second address is an IPv6 address.

5. The method of claim 1, wherein:

the subnet is an IPv4 subnet;

the first address corresponds to a subnet address associated with the IPv4 subnet;

the second address is an IPv4 address; and the lengths of the prefix parts of the first and second addresses are equal to a length of a subnet mask associated with the IPv4 subnet.

6. The method of claim 1, comprising:

presenting a first symbol representing the subnet connected to a second symbol representing a device having the second address when a relationship is inferred between the second address and the subnet.

7. A computer implemented method for inferring address and subnet relationships, the method comprising:

determining, by a processor, when a second address is a subnet address;

identifying, by a processor, a subnet associated with the second address when the second address is a subnet address;

determining, by a processor, when a portion of the second address matches a portion of a first address; wherein the first address includes a prefix part and a non-prefix part; and the second address includes a prefix part and a non-prefix part;

determining, by a processor, when lengths of the prefix parts of the first and second addresses are equal based on a first stored prefix length value corresponding to the first address and a second stored prefix length value corresponding to the second address;

inferring, by a processor, a relationship between the subnet and the first address when the portion of the second address matches the portion of the first address, and the first stored prefix length value and the second stored prefix length value are equal; and converting the first address to a binary bit string; and truncating the binary bit string to the length of the prefix part of the first address to form the portion of the first address;

wherein the determining when the portions of the first and second addresses match comprising:

determining a length of the binary bit string;

appending at least one logical zero bit onto an end of the portion of the first address until the length of the truncated binary bit string plus the at least one appended logical zero bit equals the length of the binary bit string; and performing an SQL query for the second address using the truncated binary bit plus the at least one appended logical zero bit.

8. The method of claim 7, wherein:

the first address is an IPv6 address;

the subnet is an IPv6 prefix group; and the second address is a prefix group address associated with the IPv6 prefix group.

9. The method of claim 7, wherein:

the first address is an IPv4 address;

the subnet is an IPv4 subnet;

the second address corresponds to a subnet address associated with the IPv4 subnet; and the lengths of the prefix parts of the first and second addresses are equal to a length of a subnet mask associated with the IPv4 subnet.

10. The method of claim 7, comprising:

identifying an interface associated with the first address; and determining a node associated with the interface.

11. The method of claim 7, comprising:

presenting a first symbol representing the subnet connected to a second symbol representing a device having the first address when a relationship is inferred between the subnet and the first address.

12. A data model comprising a computer readable storage medium for inferring address and subnet relationships, the data model comprising:

a subnet object associated with a first address, the subnet object including a first code module configured to determine when a second address is included in a subnet associated with the first address based on a first stored prefix length entry value associated with the first address; and an address object associated with the second address, the address object including a second code module configured to determine when the subnet associated with the first address includes the second address based on a second stored prefix length entry value associated with the second address, wherein the first address includes a prefix part and a non-prefix part, wherein the second address includes a prefix part and a non-prefix part, wherein a relationship between the first address and the second address is inferred when it is determined that the subnet associated with the first address includes the second address and when the first stored prefix length entry value associated with the first address and the second stored prefix length entry value associated with the second address are equal; and wherein the subnet object comprises:

a third code module configured to retrieve the first address from a relational database management system (RDBMS); and a fourth code module configured to determine a length of a prefix part of the first address.

13. The data model of claim 12, wherein the address object comprises:
a fifth code module configured to retrieve the second address from a relational database management system (RDBMS);
a sixth code module configured to retrieve the second address from the RDBMS in a bit string format;
a seventh code module configured to determine a length of a prefix part of the second a address;
an eighth code module configured to determine when the second address is a subnet address;
a ninth code module configured to identify a subnet associated with the second address when the second address is a subnet address; and
a tenth code module configured to identify at least one of an interface and a node associated with the second address.

14. A computer readable storage medium storing a computer program for inferring address and subnet relationships, wherein the computer program comprises executable instructions for:
identifying a first address associated with a subnet;
determining a length of a prefix part of the first address based on a first stored prefix length entry value associated with the first address;
determining a length of a prefix part of a second address based on a second stored prefix length entry value associated with the second address;
determining when a portion of the second address matches a portion of the first address;
determining when the lengths of the prefix parts of the first and second addresses are equal based on the first and second stored prefix length entry values;
inferring a relationship between the second address and the subnet when the portion of the second address matches the portion of the first address and the lengths of the prefix parts of the first and second addresses are equal;
converting the first address to a binary bit string; and truncating the binary bit string to the length of the prefix part of the first address to form the portion of the first address;
performing an SQL wildcard match for the second address using the truncated binary bit string;
wherein the first address includes the prefix part and a non-prefix part, and
wherein the second address includes the prefix part and a non-prefix part.

15. The computer readable storage medium of claim 14, wherein the computer program comprises executable instructions for:
determining when the second address is a subnet address; and inferring the relationship between the second address and the subnet only when the second address is not a subnet address.

16. The computer readable storage medium of claim 14, wherein the computer program comprises executable instructions for:
identifying an interface associated with the second address; and identifying a node associated with the interface.

17. The computer readable storage medium of claim 14, wherein the computer program comprises executable instructions for:
presenting a first symbol representing the subnet connected to a second symbol representing a device having the second address when a relationship is inferred between the second address and the subnet.

18. A computer readable storage medium storing a computer program for inferring address and subnet relationships, wherein the computer program comprises executable instructions for:
determining a length of a prefix part of a first address based on a first stored prefix length entry value associated with the first address;
determining a length of a prefix part of a second address based on a second stored prefix length entry value associated with the second address;
determining when the second address is a subnet address;
identifying a subnet associated with the second address when the second address is a subnet address;
determining when a portion of the second address matches a portion of the first address;
determining when the lengths of the prefix parts of the first and second addresses are equal based on the first and second stored prefix length entry values;
inferring a relationship between the subnet and the first address when the portion of the second address matches the portion of the first address and the lengths of the prefix parts of the first and second addresses are equal;
converting the first address to a binary bit string; and truncating the binary bit string to the length of the prefix part of the first address to form the portion of the first address;
determining a length of the binary bit string;
appending at least one logical zero bit onto an end of the portion of the first address until the length of the truncated binary bit string plus the at least one appended logical zero bit equals the length of the binary bit string; and
performing an SQL query for the second address using the truncated binary bit plus the at least one appended logical zero bit;
wherein the first address includes the prefix part and a non-prefix part, and
wherein the second address includes the prefix part and a non-prefix part.

19. The computer readable storage medium of claim 18, wherein the computer program comprises executable instructions for:
identifying an interface associated with the first address; and
determining a node associated with the interface.

20. The computer readable storage medium of claim 18, wherein the computer program comprises executable instructions for:
presenting a first symbol representing the subnet connected to a second symbol representing a device having the first address when a relationship is inferred between the subnet and the first address.

21. A computer implemented system for inferring address and subnet relations, comprising:
a processor for identifying a first address associated with a subnet, determining a length of a prefix part of the first address based on a first stored prefix length entry value associated with the first address, determining a length of a prefix part of a second address based on a second stored prefix length entry value associated with the second address, determining when a portion of the second address matches a portion of the first address, determining when the lengths of the prefix parts of the first and second addresses are equal based on the first and second stored prefix length entry value, and inferring a relationship between the second address and the subnet when the portion of the second address matches the portion of the first address and the lengths of the prefix parts of the first and second addresses are equal; and a display associated with the processor for presenting the relationship;

wherein the processor converts the first address to a binary bit string, truncates the binary bit string to the length of the prefix part of the first address to form the portion of the first address, and performs an SQL wildcard match for the second address using the truncated binary bit string.

22. The system according to claim 21, wherein:
the subnet is an IPv6 prefix group;
the first address is a prefix group address associated with the IPv6 prefix group; and
the second address is an IPv6 address.

23. The system according to claim 21, wherein:
the subnet is an IPv4 subnet;
the first address corresponds to a subnet address associated with the IPv4 subnet;
the second address is an IPv4 address; and
the lengths of the prefix parts of the first and second addresses are equal to a length of a subnet mask associated with the IPv4 subnet.

24. A computer implemented system for inferring address and subnet relationships, comprising:

a processor for determining a length of a prefix part of a first address-based on a first stored prefix length entry value associated with the first address, determining a length of a prefix part of a second address based on a second stored prefix length entry value associated with the second address, determining when the second address is a subnet address, identifying a subnet associated with the second address when the second address is a subnet address, determining when a portion of the second address matches a portion of the first address, determining when the lengths of the prefix parts of the first and second addresses are equal based on the first and second stored prefix length entry value, and inferring a relationship between the subnet and the first address when the portion of the second address matches the portion of the first address and the lengths of the prefix parts of the first and second addresses are equal; and a display associated with the processor for presenting the relationships;

wherein the processor, converts the first address to a binary bit string, truncates the binary bit string to the length of the prefix part of the first address to form the portion of the first address, determines a length of the binary bit string, appends at least one logical zero bit onto an end of the portion of the first address until the length of the truncated binary bit string plus the at least one appended logical zero bit equals the length of the binary bit string; and performs an SQL query for the second address using the truncated binary bit plus the at least one appended logical zero bit.

25. The system according to claim 24, wherein:
the first address is an IPv6 address;
the subnet is an IPv6 prefix group; and
the second address is a prefix group address associated with the IPv6 prefix group.

26. The system according to claim 24, wherein:
the first address is an IPv4 address;
the subnet is an IPv4 subnet;
the second address corresponds to a subnet address associated with the IPv4 subnet; and
the lengths of the prefix parts of the first and second addresses are equal to a length of a subnet mask associated with the IPv4 subnet.

27. The method of claim 1, wherein the first and second addresses are both read from a RDBMS address table.

28. The method of claim 7, wherein the first and second addresses are both read from a RDBMS address table.

29. The data model of claim 12, wherein the first and second addresses are both read from a RDBMS address table.

30. The computer readable storage medium of claim 14, wherein the first and second addresses are both read from a RDBMS address table.

31. The computer readable storage medium of claim 18, wherein the first and second addresses are both read from a RDBMS address table.

32. The system of claim 21, wherein the first address includes the prefix part and a non-prefix part, and wherein the second address includes the prefix part and a non-prefix part.

33. The system of claim 32, wherein the first and second addresses are both read from a RDBMS address table.

34. The system of claim 24, wherein the first address includes the prefix part and a non-prefix part, and wherein the second address includes the prefix part and a non-prefix part.

35. The system of claim 34, wherein the first and second addresses are both read from a RDBMS address table.

36. The method of claim 1, wherein determining the length of the prefix part of the first address and determining the length of the prefix part of the second address are performed before inferring the relationship.

* * * * *